May 5, 1959     W. F. HOLIN     2,885,034
BRAKE RIGGING FOR RAILWAY VEHICLE TRUNK

Filed March 10, 1955     3 Sheets-Sheet 1

INVENTOR
William F. Holin
BY
J. C. Thorpe
ATTORNEY

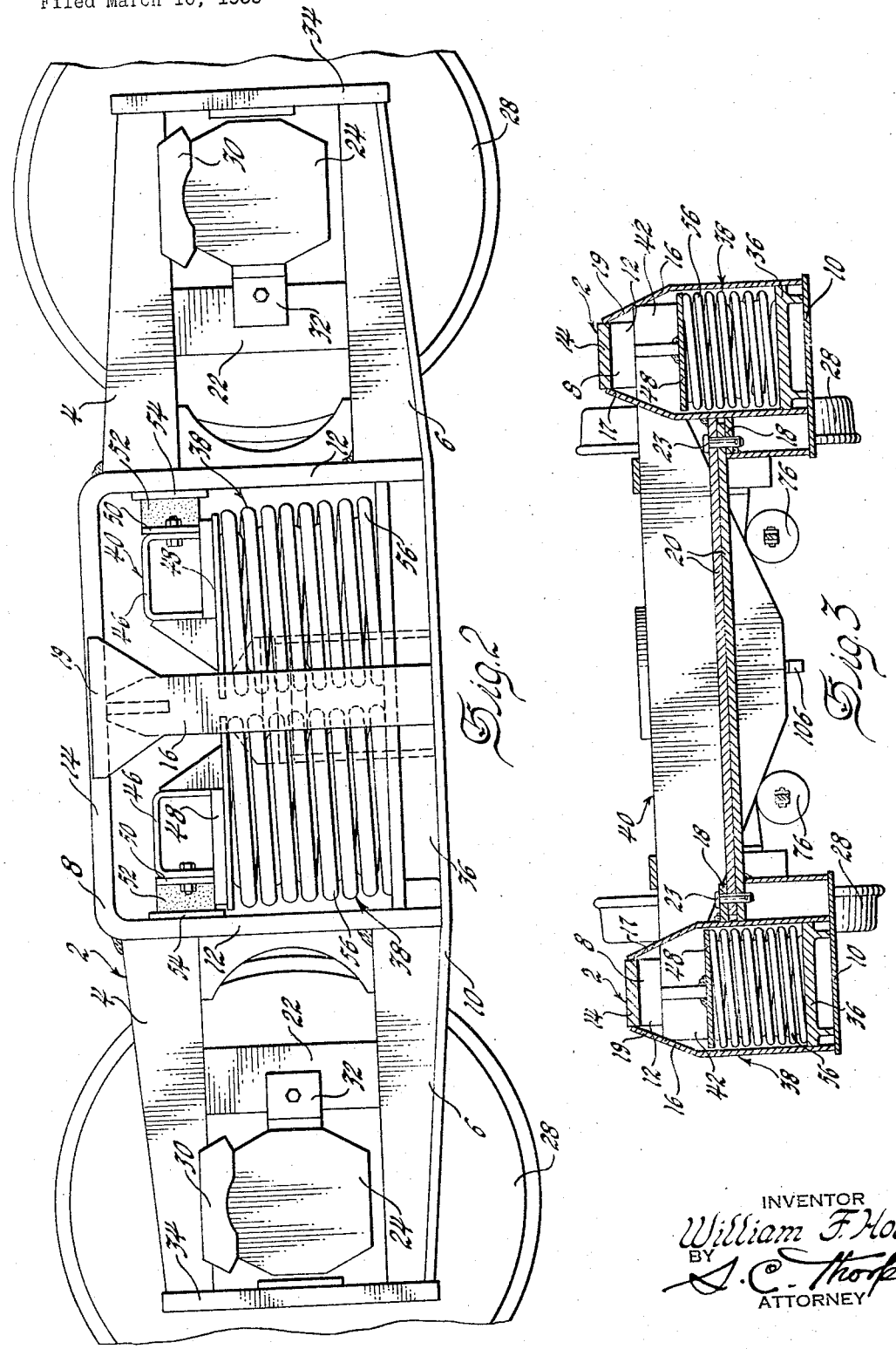

May 5, 1959   W. F. HOLIN   2,885,034
BRAKE RIGGING FOR RAILWAY VEHICLE TRUNK
Filed March 10, 1955   3 Sheets-Sheet 3

INVENTOR
William F. Holin
BY
J. C. Thorpe
ATTORNEY

United States Patent Office 2,885,034
Patented May 5, 1959

2,885,034

BRAKE RIGGING FOR RAILWAY VEHICLE TRUCK

William F. Holin, Riverside, Ill., assignor to General Motors Corporation, Detroit, Mich., a corporation of Delaware Application March 10, 1955, Serial No. 493,342

4 Claims. (Cl. 188—195)

This invention relates generally to railway vehicle trucks and more particularly to high speed freight and passenger car trucks of the type which are subjected to widely variable speeds and loads.

One of the objects of this invention is to provide a railway vehicle truck wherein the side frames are secured together by means of flexible tie plates which maintain the truck axle assemblies in alignment while at the same time allowing for lateral, longitudinal and skew loads.

It is a further object of this invention to provide automatic load-compensating brakes for the unique truck so that when the cars which the trucks support are empty the brake shoe pressures will be relatively light and when the cars are loaded the shoe pressures will be relatively heavy.

Another object of this invention is to provide resilient thrust plates between bolster and frame to cushion longitudinal shock between bolster and frame.

One of the difficulties of present railway vehicle trucks is that they do not provide for a sufficient amount of flexibility between side frames of the truck while at the same time maintaining adequate tram between these side frames. If some means are provided, however, which give the truck the desired flexibility usually the side frames are difficult to assemble together. The present invention, by means of unique transversely extending flexible tie pieces which are fastened at opposite ends adjacent the side frames, provides side frame assemblies which give the truck the required flexibility while at the same time making it extremely easy to assemble.

Another difficulty has arisen in connection with railway brakes which is due to the increasing use by the railroads of much lighter weight cars. The maximum permissible empty weight braking ratio of railway cars is considered to be around 75%. This means that if an empty car is to be braked the braking forces should not exceed 75% of the weight of the empty car. If the car is a light-weight car and the usual single capacity brakes are used there will be a large spread between empty and loaded car braking ratios. This is true because the maximum braking forces available with single capacity brakes regardless of whether the car is empty or loaded is about 75% of the weight of the empty car. This may bring the loaded car braking ratio to less than 16% depending, of course, on the ratio of the tare to the gross. For these reasons, a multi-capacity brake is required to maintain for these lighter cars operating at higher speeds the same satisfactory performance heretofore provided by single capacity brakes. The present invention automatically varies the braking forces with changes in loading and is suitable for all types of railway vehicles with a wide range of gross-to-tare weights.

For a fuller understanding of the above and other objects of this invention reference may be had to the accompanying detailed description and drawings, in which:

Fig. 2 is a side view in elevation of the truck illustrating the novel resilient thrust plates acting between bolster and frame for transmitting longitudinal movement between bolster and frame and absorbing longitudinal shock between bolster and frame.

Fig. 3 is an end view in section taken on the line 3—3 of Fig. 1 showing in detail the new transversely extending tie pieces or plates and how they are easily fastened together adjacent the side frame members.

Figure 1:
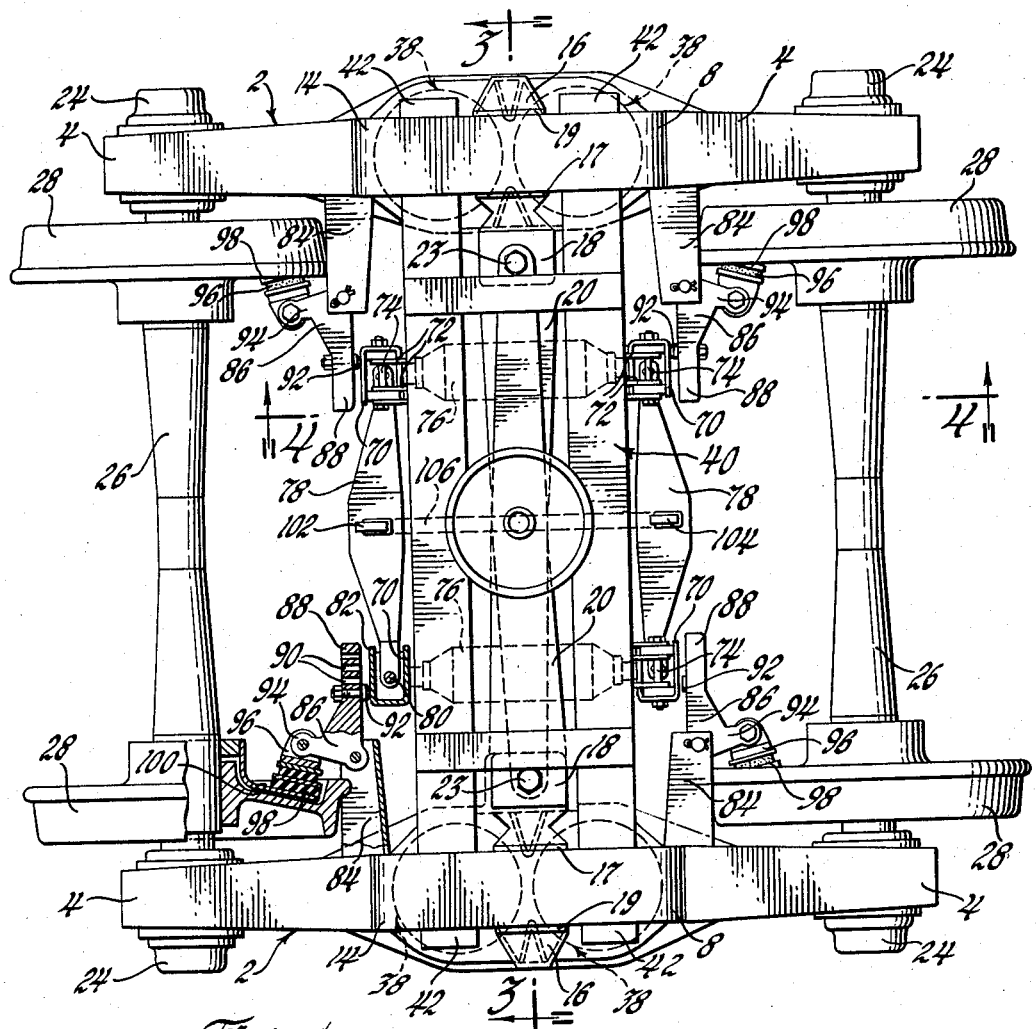
Fig. 1 is a view in plan of the railway vehicle truck embodying various features of the invention.

Referring first to Figs. 1, 2 and 3 it will be observed that the truck includes a pair of oppositely disposed side frames indicated generally by the numerals 2. These side frames 2 are fabricated and comprise oppositely extending horizontal pedestal sets 4, 6 which are suitably joined, as by welding, to a U-shaped member 8. The lower members 6 of the pedestal sets are suitably reinforced by means of a plate 10 extending longitudinally along the undersides thereof and below the legs of the member 8. Intermediate the legs 12 of member 8 and extending from the plate 10 to the base 14 of memebr 8 is a vertical divided reinforcing assembly 16 comprising inner and outer vertical plates 17 and 19 secured at their lower edges to plate 10 and at their upper edges to the base 14 of member 8. Each of the inner plates 17 has secured thereto a horizontally inwardly extending lug 18 and an inwardly transversely extending tie piece or plate 20. It will be observed, however, in the case of one of the side frames 2 the lug 18 is located above the tie piece 20 whereas in the case of the other side frame 2 the lug 18 is located below the tie piece 20. Extending vertically between the members 4 and 6 are reinforcing pieces 22 which act as guide pieces and form openings for the reception of journal box assemblies 24 on the ends of the axles 26 to which are attached for rotation therewith the usual wheels 28. These journal box assemblies 24 are held in place by retainer plates 30 and 32 engageable with the members 22 and 4 and also by the straps 34 which are secured to the ends of the pedestal sets 4, 6.

Figure 4:
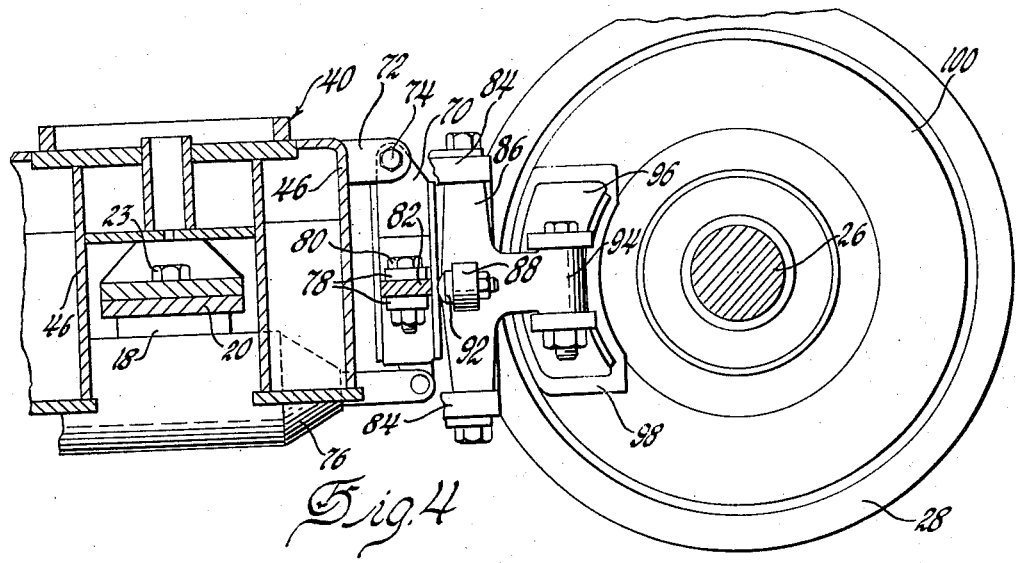
Fig. 4 is an enlarged fragmentary view in elevation and in section taken substantially on the line 4—4 of Fig. 1 and further illustrates details of the transversely extending tie pieces and also certain details of the novel brake assembly.

As best seen in Figs. 1, 3 and 4 the tie pieces 20 overlap each other and are fastened together at their opposite ends by pins 23 which extend through the ends and also through lugs 18 and the tie pieces adjacent their rigid connections with the side frames. This manner of connection due to the flexibility of the tie pieces 20 affords the flexibility needed to give a superior riding truck while at the same time maintaining adequate tram between the side frames. It will be appreciated that such side frame assemblies are extremely easy to assemble to form the truck frame since it is only necessary to bring the assemblies together so that the tie plates 20 properly overlap and then drop the pins 23 into place. Normally the bolster springs would be already assembled in the side frames and the bolster would be suspended ready for assembly along with the side frames. A description of the bolster springs, bolster and their manner of assembly follows below.

Mounted on the upper side of the plate 10 between the legs 12 of each of the inverted U-shaped members 8 is a spring seat 36 upon which is seated in longitudinally spaced relation variable rate bolster spring sets indicated generally by the numerals 38. Extending transversely of the truck is a truck bolster indicated generally by the numeral 40 having fabricated bifurcated ends 42, each of which is supported by the upper end of one of the variable rate bolster spring sets 38. Each end 42 includes an inverted U-shaped section 46 to which is secured on the underside thereof a fabricated upper spring seat 48 which actually engages the upper end of its associated bolster spring set 38. Secured to one leg of each of the inverted U-shaped sections 46 is a plate 50 to which is bolted a resilient longitudinal end-facing thrust block 52 engageable with a longitudinal center-facing chafing plate 54 provided on the inner surface of each of the legs 12.

Figure 5:
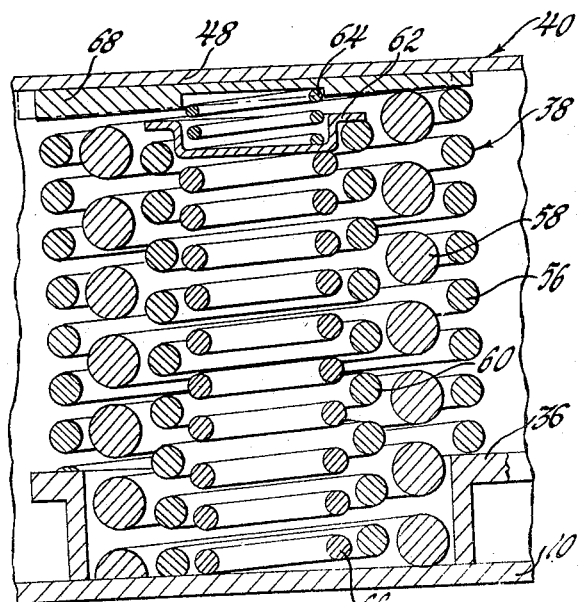
Fig. 5 is an enlargement in section of one of the sets of bolster springs acting between bolster and frame illustrating how this bolster spring set has a variable rate so that the amount of deflection increases at a decreasing rate in response to additional load applied to the truck bolster.

Turning for a moment to Fig. 5 it will be observed that each of the bolster spring sets 38 includes an outer spring 56 which extends between the seat 36 and the seat 48 on the underside of a bolster end 42. There is also a relatively large spring 58 also extending between its seat on plate 10 and the seat 48. A spring 60 extends between its spring seat on plate 10 and the underside of a cupped washer 62 which in turn is maintained in series between a relatively weak short spring 64 and a somewhat stronger spring 66. As already pointed out, the upper ends of the springs 56, 58 and 64 do not actually engage the underside of the bolster ends 42 but rather engage a wedge-shaped member 68 (part of seat 48) located between the underside of the ends 42 and the upper ends of these springs. This wedge-shaped member causes the springs to exert a horizontally acting force on the bolster which tends to turn it thereby generating frictional forces between the diagonally located thrust blocks 52 and chafing plates 54. These frictional forces tend to damp lateral and vertical movement of the bolster relative to the truck frame. It will also be observed that because of the relatively small spring 64 as the bolster moves down under increased loads most of the initial deflection occurs in the relatively small spring 64. Once the bolster has been loaded sufficiently to cause the washer 62 to be engaged by the wedge-shaped member 68, however, then spring 64 may no longer be deflected and increasing resistance to further deflection is offered by springs 60 and 66 acting in series with spring 64. This use of variable rate bolster spring sets enables these trucks to provide the car which they support with a relatively soft ride when the car is empty and also when it is loaded without the large amounts of deflection required when only soft spring sets acting in parallel are used.

Another extremely important feature of this truck comprises the brake rigging therefor which, as shown in the figures, includes four rectangularly disposed vertical brake levers 70 pivotally hung from the bolster by means of lugs 72 and pins 74. It will be noted from Figs. 1 and 4 that a pair of longitudinally extending brake cylinders 76 connect the lower ends of longitudinally spaced pairs of the brake levers together on the underside of the bolster 40. As will be further observed from Fig. 1 two of the brake levers 70 are located on opposite sides of the bolster 40 and these levers are connected together by means of transverse brake beams 78 which are pivotally connected by suitable pivotal connections 80 to plates 82 provided between the legs and base of the vertical levers 70 which are U-shaped in character. Secured to the side frames 2 are four rectangularly located brackets 84 which pivotally support for horizontal swinging movement suitable brake levers 86. Each lever 86 includes an arm 88 having a plurality of holes 90 provided therein one of which is supported the shank of an engaging button 92 in engagement with a vertical surface on the brake levers 70. The levers 86 also include an arm 94 to which is pivotally secured a brake head 96 carrying thereon a suitable brake shoe 98. Brake shoe 98 engages a brake drum 100 supported immediately inside the wheel 28 and formed so that it follows the contour of the flange of the wheel 28. Extending between the brake beams 78 is a suitable hand-operated linkage comprising a pair of vertical levers 102 and 104 interconnected by a link 106 so that actuation of either lever 102 or 104 will tend to separate the beams 78.

From the foregoing description it will be appreciated that the levers 70 and the brake cylinders 76 which connect the lower ends of sets of these levers are suspended or hung from the bolster 40 so that upon loading of the bolster 40 and deflection of the spring sets 38 the levers 70 will also move downwardly. This results in greater leverage being applied to the levers 86 when the brakes are actuated by any given force determined either by the force applied to the hand means 102, 104 or by the pressure contained in the cylinders 76. Since, as the levers 70 move downwardly, greater leverage is obtainable and greater forces are applied to the levers 86 more braking is obtained automatically upon increased loading of the truck. In order to properly provide for refined adjustment of the brake rigging the shanks of the buttons may be located in any one of the plurality of holes 90 to decrease or increase the amount of leverage exertable by the levers 86. It will thus be appreciated that this unique braking arrangement automatically enables the braking forces used when the cars are empty to be held to a predetermined maximum while at the same time allowing increased braking when the cars are heavily laden.

I claim:

1. In a railway vehicle truck including a pair of transversely spaced longitudinally extending side frame members and a truck bolster resiliently supported thereon, brake rigging comprising a vertical first brake lever pivotally supported by said bolster at the upper end thereof, lever actuating means connected to the lower end of said lever, a second horizontal lever supported on one of said side frame members for pivotal movement in a horizontal plane, a friction braking surface associated with a wheel of said truck, a brake shoe on said second lever engageable with said surface, said second lever slidably engaging a surface on said first lever whereby the force exertable on said second lever by said first lever increases upon downward movement of said bolster relative to said frame.

2. In a railway vehicle truck including a pair of transversely spaced longitudinally extending side frame members and a truck bolster resiliently supported thereon, brake rigging comprising a vertical first brake lever pivotally supported by said bolster at the upper end thereof, lever actuating means connected to the lower end of said lever, a second horizontal lever supported on one of said side frame members for pivotal movement in a horizontal plane, a frictional braking surface associated with a wheel of said truck, a shoe on said second lever engageable with said surface, said second lever slidably engaging a surface on said first lever whereby the force exertable on said last-mentioned lever by said first lever increases upon downward movement of said bolster relative to said frame, and fulcrum means adjustable to vary the leverage of said second lever.

3. In a railway vehicle truck including a frame and a truck bolster resiliently supported thereon, brake rigging comprising a first brake lever hung from said bolster for swinging movement relative thereto, lever actuating means connected to said lever, a second horizontal lever supported on said frame for movement relative thereto in a horizontal plane, a frictional braking surface associated with a wheel and axle set of said truck, a shoe on said second lever engageable with said surface, said second lever being engaged by said first lever so that the mechanical advantage of said lever system when transmitting braking forces to said set increases upon downward movement of said bolster relative to said frame.

4. In a railway vehicle truck including a pair of transversely spaced longitudinally extending side frame members and a truck bolster, brake rigging comprising resilient means having a decreasing rate of deflection supporting said bolster on said frame, a vertical first brake lever pivotally supported by said bolster at the upper end thereof, lever actuating means connected to the lower end of said lever, a second horizontal lever supported on one of said side frame members for pivotal movement in a horizontal plane, a frictional braking surface associated with a wheel of said truck, a shoe on said second lever engageable with said surface, said second lever slidably engaging a surface on said first lever whereby the force exertable on said last-mentioned lever by said first lever increases upon downward movement of said bolster relative to said frame due to deflection of said resilient means under increased load, and fulcrum means adjustable to vary the leverage of said second lever.

References Cited in the file of this patent

UNITED STATES PATENTS

| | | |
|---|---|---|
| 1,278,740 | Pflager | Sept. 10, 1918 |
| 1,358,016 | Pflager | Nov. 9, 1920 |
| 2,001,327 | Johnson | May 14, 1935 |
| 2,172,049 | Ledwinka | Sept. 5, 1939 |
| 2,339,440 | Tramblie | Jan. 18, 1944 |
| 2,432,467 | Carlbom | Dec. 9, 1947 |